United States Patent
Caldwell et al.

[19]

[11] Patent Number: 6,061,806
[45] Date of Patent: *May 9, 2000

[54] METHOD AND APPARATUS FOR MAINTAINING AUTOMATIC TERMINATION OF A BUS IN THE EVENT OF A HOST FAILURE

[75] Inventors: Barry E. Caldwell, Whitewater; Raymond S. Rowhuff, Valley Center; Kenneth J. Thompson, Wichita, all of Kans.

[73] Assignee: LSI Logic Corporation, Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/854,298

[22] Filed: May 12, 1997

[51] Int. Cl.$^7$ ...................................................... G06F 11/00
[52] U.S. Cl. .............................................. 714/3; 395/281
[58] Field of Search ........................ 395/183.01, 182.02, 395/183.06, 183.19, 183.2, 281, 306, 280, 283, 325, 182.03, 284, 288, 289, 182.22, 183.21

[56] References Cited

U.S. PATENT DOCUMENTS

| | | | |
|---|---|---|---|
| 3,729,725 | 4/1973 | Denney et al. | 360/47 |
| 4,220,876 | 9/1980 | Ray | 307/296 |
| 4,367,525 | 1/1983 | Brown | 364/200 |
| 4,748,426 | 5/1988 | Stewart | 333/22 |
| 4,831,283 | 5/1989 | Newton | 307/443 |
| 4,920,339 | 4/1990 | Friend et al. | 340/825.52 |
| 4,965,723 | 10/1990 | Kirk et al. | 364/200 |
| 5,029,284 | 7/1991 | Feldbaumer et al. | 307/443 |
| 5,099,137 | 3/1992 | Lattin, Jr. | 307/147 |
| 5,101,481 | 3/1992 | Anger et al. | 395/325 |
| 5,120,909 | 6/1992 | Kutz et al. | 178/63 R |
| 5,157,771 | 10/1992 | Losi et al. | 395/325 |
| 5,191,581 | 3/1993 | Woodbury et al. | 370/85.9 |
| 5,204,669 | 4/1993 | Dorfe et al. | 340/825.52 |
| 5,239,559 | 8/1993 | Brach et al. | 375/36 |
| 5,239,658 | 8/1993 | Yamamuro et al. | 395/800 |
| 5,265,038 | 11/1993 | Kowk | 364/572 |
| 5,313,105 | 5/1994 | Samela et al. | 307/99 |
| 5,313,595 | 5/1994 | Lewis et al. | 395/325 |
| 5,327,114 | 7/1994 | Straate et al. | 340/286.06 |
| 5,338,979 | 8/1994 | Mammano et al. | 307/443 |
| 5,367,647 | 11/1994 | Coulson et al. | 395/325 |

(List continued on next page.)

FOREIGN PATENT DOCUMENTS

| | | | |
|---|---|---|---|
| 0531630 | 3/1993 | European Pat. Off. | G06F 13/40 |
| 0076921 | 4/1993 | European Pat. Off. | G06F 11/34 |
| 0645716 | 3/1995 | European Pat. Off. | G06F 13/40 |
| 0671691 | 9/1995 | European Pat. Off. | G06F 13/12 |
| 0742612 | 11/1996 | European Pat. Off. | H01R 43/26 |
| 0575237 | 12/1993 | France . | |
| 5584052 | 6/1980 | Japan | 360/47 |
| 1223667 | 9/1989 | Japan | 360/47 |
| 9408035 | 4/1994 | WIPO | G06F 13/40 |

OTHER PUBLICATIONS

VLSI and Computer Peripherals, Hamburg; May 8–12, 1989; W. Proebster et al.; VLSI Based Tools for Monitoring Bus Communication Channels; pp. 4–81–84.

*Primary Examiner*—Robert W. Beausoliel, Jr.
*Assistant Examiner*—Nadeem Iqbal

[57] ABSTRACT

A method and apparatus for maintaining automatic termination of a bus in the event of failure of a host computer are disclosed. The method includes the steps of (a) powering a first termination control circuit and a first terminating circuit of the first bus controller with the bus; (b) generating a first control signal (1) that is of an enable state if the first bus controller is located at an end of the bus, and (2) that is of a disable state if the first bus controller is located in a middle portion of the bus; (c) coupling the first terminating circuit to the bus if the first control signal is of the enable state; and (d) decoupling the first terminating circuit from the bus if the first control signal is of the disable state.

21 Claims, 7 Drawing Sheets

U.S. PATENT DOCUMENTS

| | | | |
|---|---|---|---|
| 5,382,841 | 1/1995 | Feldbaumer | 326/30 |
| 5,410,141 | 4/1995 | Koenck et al. | 235/472 |
| 5,422,580 | 6/1995 | Mandel et al. | 326/30 |
| 5,422,761 | 6/1995 | Anderson et al. | 360/47 |
| 5,434,516 | 7/1995 | Kosco | 326/30 |
| 5,450,425 | 9/1995 | Gunn et al. | 371/67.1 |
| 5,455,926 | 10/1995 | Keele et al. | 395/404 |
| 5,465,042 | 11/1995 | Samela et al. | 324/71.1 |
| 5,467,453 | 11/1995 | Kocis | 395/281 |
| 5,469,554 | 11/1995 | Tucker et al. | 395/420 |
| 5,473,264 | 12/1995 | Mader et al. | 326/30 |
| 5,495,584 | 2/1996 | Holman, Jr. et al. | 395/308 |
| 5,510,701 | 4/1996 | Samela et al. | 324/71.1 |
| 5,511,229 | 4/1996 | Tsujimoto | 395/851 |
| 5,546,017 | 8/1996 | Vitunic | 326/30 |
| 5,553,250 | 9/1996 | Miyagawa et al. | 395/309 |
| 5,555,510 | 9/1996 | Verseput et al. | 364/514 |
| 5,564,024 | 10/1996 | Pemberton | 395/283 |
| 5,568,046 | 10/1996 | Samela et al. | 324/71.1 |
| 5,574,946 | 11/1996 | Sala | 395/825 |
| 5,583,448 | 12/1996 | Corder et al. | 326/30 |
| 5,585,741 | 12/1996 | Jordan | 326/30 |
| 5,586,271 | 12/1996 | Parrett | 395/283 |
| 5,613,074 | 3/1997 | Galloway | 395/280 |
| 5,635,853 | 6/1997 | Kikinis | 326/30 |
| 5,664,221 | 9/1997 | Amberg et al. | 395/829 |
| 5,680,537 | 10/1997 | Byers et al. | 395/182.03 |
| 5,680,555 | 10/1997 | Bodo et al. | 395/306 |
| 5,715,409 | 2/1998 | Bucher et al. | 395/309 |
| 5,751,977 | 5/1998 | Alexander | 395/306 |
| 5,764,925 | 6/1998 | Noonan | 395/281 |
| 5,768,621 | 6/1998 | Young | 395/844 |
| 5,781,028 | 7/1998 | Decuir | 326/30 |

|    | A         | B       | C          | D          | E          | F        | G        |
|----|-----------|---------|------------|------------|------------|----------|----------|
|    | override* | wide 1* | present 2* | present 3* | present 1* | enable 1 | enable 2 |
| 1  | 0 | 0 | 0 | 0 | 0 | 0 | 1 |
| 2  | 0 | 0 | 0 | 0 | 1 | 0 | 1 |
| 3  | 0 | 0 | 0 | 1 | 0 | 0 | 1 |
| 4  | 0 | 0 | 0 | 1 | 1 | 0 | 1 |
| 5  | 0 | 0 | 1 | 0 | 0 | 0 | 1 |
| 6  | 0 | 0 | 1 | 0 | 1 | 0 | 1 |
| 7  | 0 | 0 | 1 | 1 | 0 | 1 | 1 |
| 8  | 0 | 0 | 1 | 1 | 1 | 1 | 1 |
| 9  | 0 | 1 | 0 | 0 | 0 | 0 | 1 |
| 10 | 0 | 1 | 0 | 0 | 1 | 0 | 1 |
| 11 | 0 | 1 | 0 | 1 | 0 | 0 | 1 |
| 12 | 0 | 1 | 0 | 1 | 1 | 1 | 1 |
| 13 | 0 | 1 | 1 | 0 | 0 | 0 | 1 |
| 14 | 0 | 1 | 1 | 0 | 1 | 1 | 1 |
| 15 | 0 | 1 | 1 | 1 | 0 | 1 | 1 |
| 16 | 0 | 1 | 1 | 1 | 1 | 1 | 1 |
| 17 | 1 | 0 | 0 | 0 | 0 | 0 | 0 |
| 18 | 1 | 0 | 0 | 0 | 1 | 0 | 0 |
| 19 | 1 | 0 | 0 | 1 | 0 | 0 | 1 |
| 20 | 1 | 0 | 0 | 1 | 1 | 0 | 1 |
| 21 | 1 | 0 | 1 | 0 | 0 | 0 | 0 |
| 22 | 1 | 0 | 1 | 0 | 1 | 0 | 0 |
| 23 | 1 | 0 | 1 | 1 | 0 | 1 | 1 |
| 24 | 1 | 0 | 1 | 1 | 1 | 1 | 1 |
| 25 | 1 | 1 | 0 | 0 | 0 | 0 | 1 |
| 26 | 1 | 1 | 0 | 0 | 1 | 0 | 1 |
| 27 | 1 | 1 | 0 | 1 | 0 | 0 | 1 |
| 28 | 1 | 1 | 0 | 1 | 1 | 1 | 1 |
| 29 | 1 | 1 | 1 | 0 | 0 | 0 | 1 |
| 30 | 1 | 1 | 1 | 0 | 1 | 1 | 1 |
| 31 | 1 | 1 | 1 | 1 | 0 | 1 | 1 |
| 32 | 1 | 1 | 1 | 1 | 1 | 1 | 1 |

*FIG. 6*

| BC\DE | 00 | 01 | 11 | 10 |
|---|---|---|---|---|
| 00 | 0 | 0 | 0 | 0 |
| 01 | 0 | 0 | 1 | 0 |
| 11 | 0 | 1 | 1 | 1 |
| 10 | 0 | 1 | 1 | 0 |

F = CD + BDE + BCE

| AB\DE | 00 | 01 | 11 | 10 |
|---|---|---|---|---|
| 00 | 1 | 1 | 1 | 0 |
| 01 | 1 | 1 | 1 | 0 |
| 11 | 1 | 1 | 1 | 1 |
| 10 | 1 | 1 | 1 | 1 |

G = B + D + $\overline{A}$

FIG. 7

METHOD AND APPARATUS FOR MAINTAINING AUTOMATIC TERMINATION OF A BUS IN THE EVENT OF A HOST FAILURE

BACKGROUND OF THE INVENTION

The present invention relates generally to computer buses for transmitting data, and more particularly to maintaining proper bus termination in data processing systems which utilize redundant bus controllers.

Today's standard computer architectures call for a number of separate components, such as a central processing unit ("CPU"), memory, ports and peripheral devices to be coupled together by electrical buses to provide a pathway for data between the various components. Electrical buses are simply groups of conductors (or lines) designed to operate as a group.

Components transmit data over buses by changing voltages on the various lines of the bus. In binary digital computers, each line in a bus is capable of assuming one of two possible states at a given moment. These states are represented by presence or absence of a voltage, or potential difference relative to ground, on each of the lines.

In the real world, buses are real electrical conductors and therefore contain impedance just as do all real conductors. This impedance traps electrical charge within the line, presenting, in a sense, a momentum against which the change must take place. When the line is directed to change from a binary one to a binary zero (meaning a grounding of the line), it resists the change, typically causing a voltage oscillation at the point of transition (termed "ringing"). This ringing may be of sufficient magnitude as to cause components reading data from the bus to misread the oscillation as the presence of a voltage (a binary one) instead of the intended binary zero, thereby corrupting the flow of data. Therefore, in such conductors, it is standard practice to provide a means by which to dissipate the electrical charge quickly and damp the ringing, so as to restore data transmission fidelity. Damping is achieved through use of a terminating circuit, which may include a plurality of resistive elements or active switches.

Some buses require terminating circuits at each end of the bus to provide effective damping. One such bus standard is the small computer systems interface ("SCSI") bus. The SCSI bus is designed to operate in conjunction with computers to provide an interface to SCSI standard peripheral devices. SCSI buses require a controller card or host card to manage communication of data between the computer and the SCSI devices and between the SCSI devices themselves. In computers, this controller card is typically placed in a backplane slot within the main chassis of the computer. The controller card contains a control circuit that manages the SCSI bus and at least one SCSI port allowing SCSI devices to couple to the card. SCSI devices are daisy chained together with a common cable. All SCSI devices operate on common signals, and both ends of the cable are terminated with hardware terminating circuits. The terminating circuits, that can be connected to either SCSI devices or to the SCSI cable itself are, as stated above, required to make data transfers on the SCSI bus reliable.

Devices connected to SCSI chains must have the correct number of terminating circuits for proper operation and to prevent damage to the SCSI controller. In systems that utilize only SCSI devices of the same bus width, there can be no more than two terminating circuits in a chain of SCSI devices, one at each end of the physical chain. This means that, if more than two SCSI devices are connected in a SCSI daisy chain, the middle device(s) in the cable must not have terminating circuits coupled to the SCSI bus. It is actually slightly more complicated than this for systems having SCSI devices of different bus widths. However, even in these systems, any one bus line of the SCSI bus is terminated only twice, once at each end of the bus line.

Some controller cards, such as the controller described in co-pending application, Auto Termination of Plural Multi-Connectors, Ser. No. 08/433,915 which is hereby incorporated by reference, provide auto-termination circuitry that determines whether the controller card is at an end of the SCSI bus and that activates terminating circuits when so determined. However, the auto-termination circuitry of these controller cards is powered by the on board power of the controller card. Therefore, if a failure occurs that effects this on board power of the controller card, then the auto-termination circuitry of the controller card may fail to properly control the terminating circuits of the controller card.

This auto-termination failure is not a major concern in systems that utilize only one controller card because if the controller card does not have power, then the SCSI bus will not properly function anyway. However, some systems utilize a feature that is known as redundancy. These systems include more than one controller card to control the SCSI bus. As a result, these system are typically more reliable because if one controller card fails, then the other controller cards of the system may still properly control the SCSI bus.

The problem that exists in these systems is that if the auto-termination circuitry on the failed controller card is no longer being powered, which is likely to be the case when the controller card fails, then the auto-termination circuitry is no longer operational and the SCSI bus may not be properly terminated. As a result, even though these systems employ redundant controller cards, a failure in a single controller card may still cause a failure on the SCSI bus due to improper bus termination.

What is needed therefore, is a method and apparatus for automatically terminating a SCSI bus and maintaining proper termination in the event of a controller card failure.

SUMMARY OF THE INVENTION

In accordance with one embodiment of the present invention, there is provided a method for maintaining automatic termination of a bus in the event of a host failure. The method includes the steps of (a) powering a first termination control circuit and a first terminating circuit of a first bus controller with the bus; (b) generating a first control signal that is of an enable state if the first bus controller is located at an end of the bus and that is of a disable state if the first bus controller is located in a middle portion of the bus; (c) coupling the first terminating circuit to the bus if the first control signal is of the enable state; and (d) decoupling the first terminating circuit from the bus if the first control signal is of the disable state.

Pursuant to another embodiment of the present invention, there is provided a controller for maintaining automatic termination of a bus in the event of a host failure. The controller includes a first bus port, a second bus port, a first terminating circuit, and a termination control circuit. The first bus port is configured to receive a first device and the second bus port is configured to receive a second device. The first terminating circuit is powered by the bus and is configured to decouple from the bus when a first control signal is of a disable state. The termination control circuit is powered by the bus and is coupled to the first terminating circuit. The termination control circuit is also configured to cause the first control signal to have the disable state when (a) the first device is coupled to the first bus port, and (b) the second device is coupled to the second bus port.

Pursuant to yet another embodiment of the present invention, there is provided a data processing system. The data processing system includes a first bus controller, a second bus controller, and a bus. The first bus controller includes a first bus port, a second bus port, a first terminating circuit, and a first termination control circuit. The second bus controller includes a third bus port. The bus interconnects the first bus port and the third bus port. The first terminating circuit is powered by the bus and is configured to couple to the bus if a first control signal is of an enable state and to decouple from the bus if the first control signal is of a disable state. The first termination control circuit is powered by the bus and is configured to generate a first control signal (1) that is of the enable state if the first bus controller is located at an end of the bus, and (2) that is of the disable state if the first bus controller is located in a middle portion of the bus.

It is an object of the present invention to provide an improved controller card.

It is a further object of the present invention to provide a controller card for redundant controller systems.

It is yet another object of the present invention to provide a method and apparatus for automatically determining the types of devices coupled to a controller of a bus and properly terminating the bus at the controller.

It is still another object of the present invention to provide a method and apparatus for automatically terminating a bus at a controller and maintaining proper termination of the bus in the event of a host failure.

The above and other objects, features, and advantages of the present invention will become apparent from the following description and the attached drawings.

BRIEF DESCRIPTION OF THE DRAWINGS

FIG. 6 shows a truth table depicting a method for properly terminating a SCSI bus at a controller;

FIG. 7 shows a Karnaugh map and equations derived from the truth table of FIG. 6.

DETAILED DESCRIPTION OF THE PREFERRED EMBODIMENT

Figure 1:
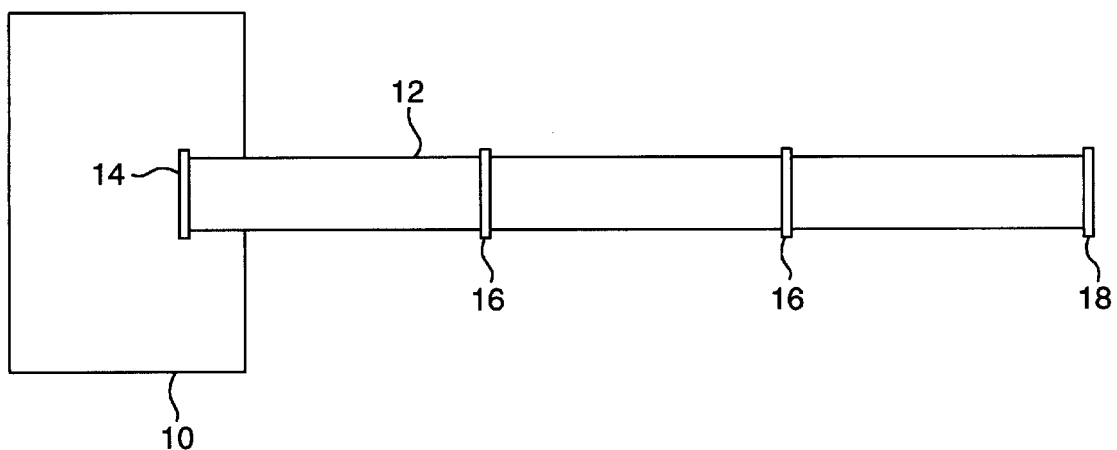
FIG. 1 shows a controller card and cable having a plurality of connectors.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

FIG. 1 shows a controller card 10, having a cable 12 attached thereto. This cable 12 typically has a connector 14 that allows the cable 12 to be detachably coupled to a receiving connector or port on the controller card 10. The controller card 10 is sometimes referred to as a host controller card when used as part of a SCSI bus interconnection scheme. The name comes from the fact that the controller card 10 would be plugged into a bus connector of a host computer (not shown), and provides the electrical and programming interface between a host central processor, and devices attached to the cable 12. These devices couple to various connectors 16, 18 that span the cable 12.

Figure 2:
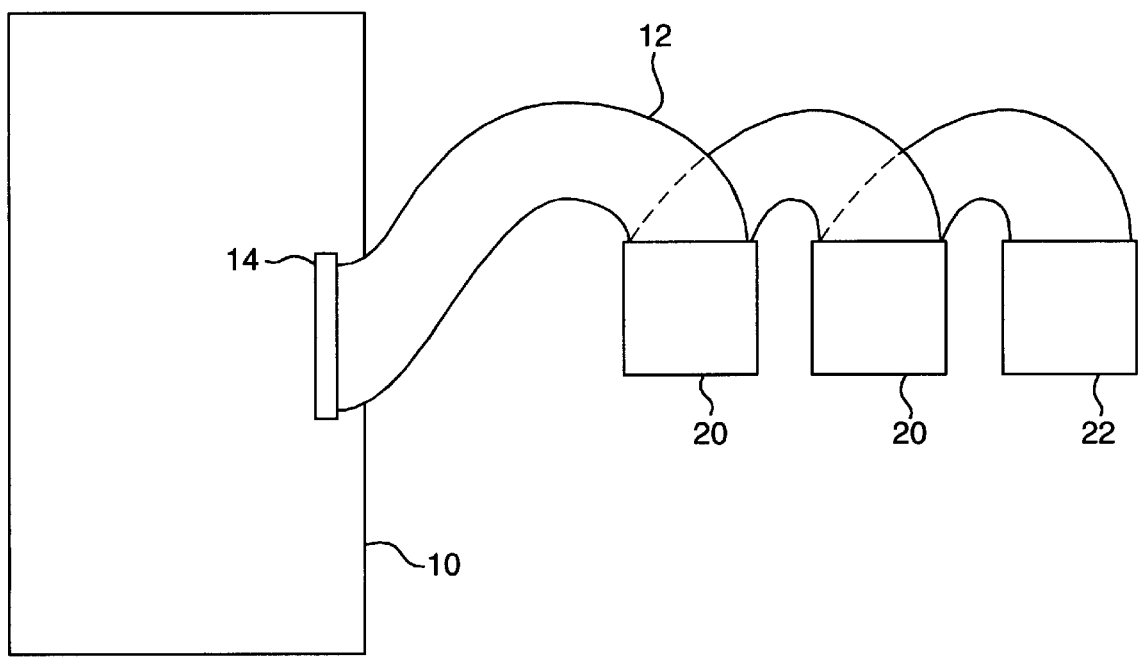
FIG. 2 shows a controller card and a plurality of peripheral devices coupled thereto in a daisy-chain fashion.

FIG. 2 shows a typical SCSI bus interconnection, where a plurality of peripheral devices 20, 22 such as disk drives are coupled to cable 12. Other types of SCSI-compliant devices could also be similarly coupled to the cable 12, such as tape drives, compact disk (CD) drives, bus controllers, and the like. As can be seen, a single cable 12 couples a plurality of devices 20 to a controller 10. This controller 10 is preferably a separate hardware card plugged into the internal bus of a computer, but could alternatively be integrated circuitry on the main system board of the computer.

In the preferred embodiment, each of these peripheral devices 20, 22 has a mechanism for coupling a terminating circuit to the bus which appropriately terminates the bus width utilized by the device. In other words, if a device 20 is a narrow SCSI device, then the device 20 has a mechanism for coupling a narrow SCSI bus terminating circuit to the SCSI bus. However, if the device 22 is a wide SCSI device, then the device 22 has a mechanism for coupling a wide SCSI bus terminating circuit to the SCSI bus. These mechanisms for coupling a terminating circuit to the SCSI bus may consist of a socket, where an RPAK can be manually inserted; a jumper or switch that can be used to manually enable/disable the terminating circuit; or a sensing circuit for automatically enabling/disabling a terminating circuit.

As previously described, it is desirable to only couple a terminating circuit to the ends of the SCSI bus. For example to properly terminate the SCSI bus depicted in FIG. 2, the device 22 which is at one end of the SCSI bus would couple its terminating circuit to the bus. Furthermore, the controller 10 which is located at the other end of the SCSI bus would couple its terminating circuit to the bus.

Figure 3:
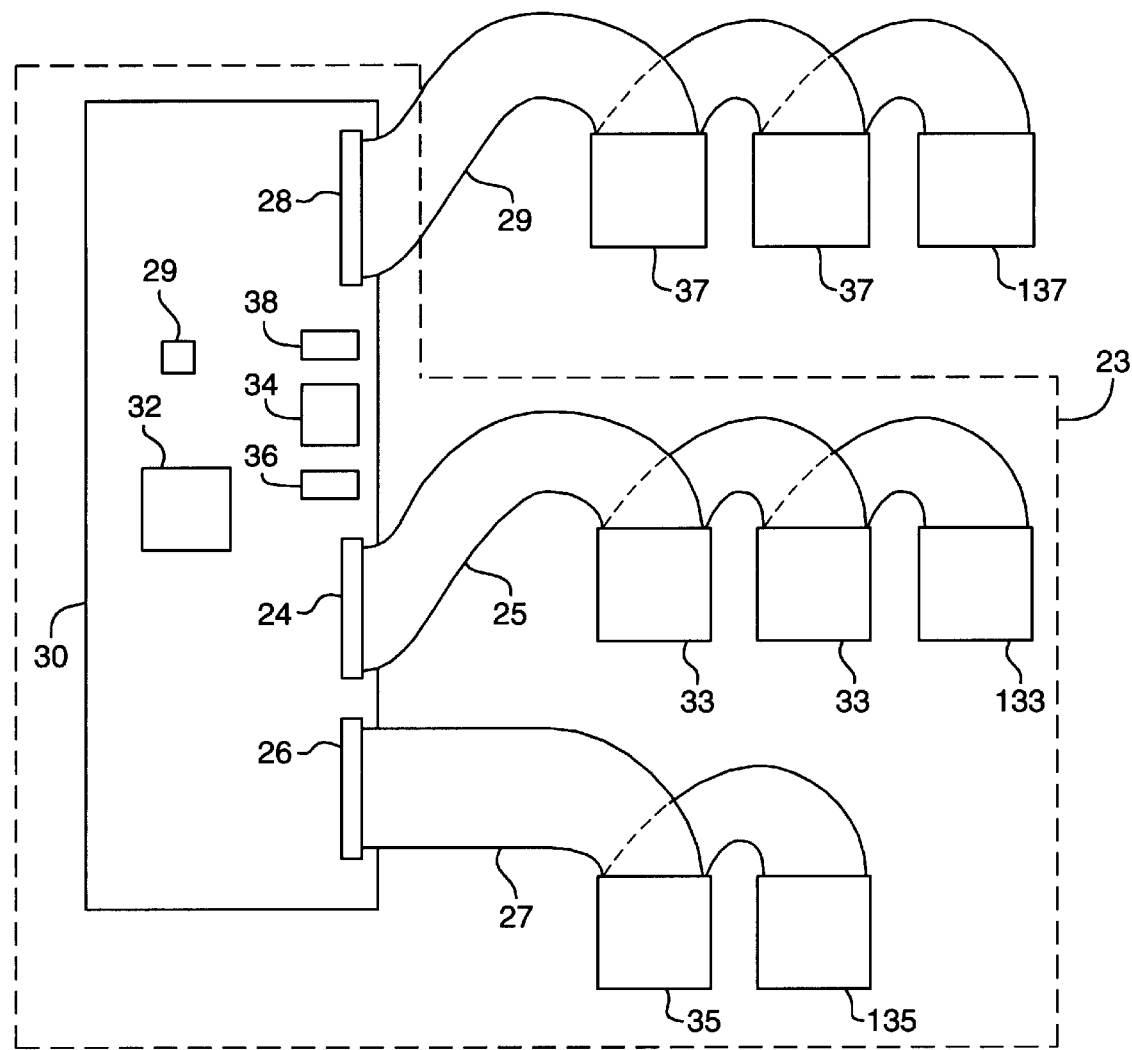
FIG. 3 shows a controller card suitable for having a plurality of devices with dissimilar bus width types coupled thereto.

FIG. 3 shows a system where a plurality of devices are coupled to a common host controller card 30. In the preferred embodiment, the controller card includes a SCSI bus controller 32, a termination control 34, two terminating circuits or terminators 36, 38, an override mechanism 39, an internal narrow SCSI connector or port 24, an internal wide SCSI connector or port 26, and an external wide SCSI connector or port 28 that may receive narrow SCSI devices via a narrow-to-wide SCSI adapter or cable.

A narrow-to-wide SCSI adapter is a piece of hardware that has a first connector configured to receive a narrow SCSI cable and a second connector configured to couple the conductors of the narrow SCSI cable to the appropriate conductors of a wide SCSI port. A narrow-to-wide SCSI cable, on the other hand, is a cable having a first connector configured to couple to a narrow SCSI device, and a second connector configured to appropriately couple the narrow SCSI device to a wide SCSI port via the cable.

Figure 4:
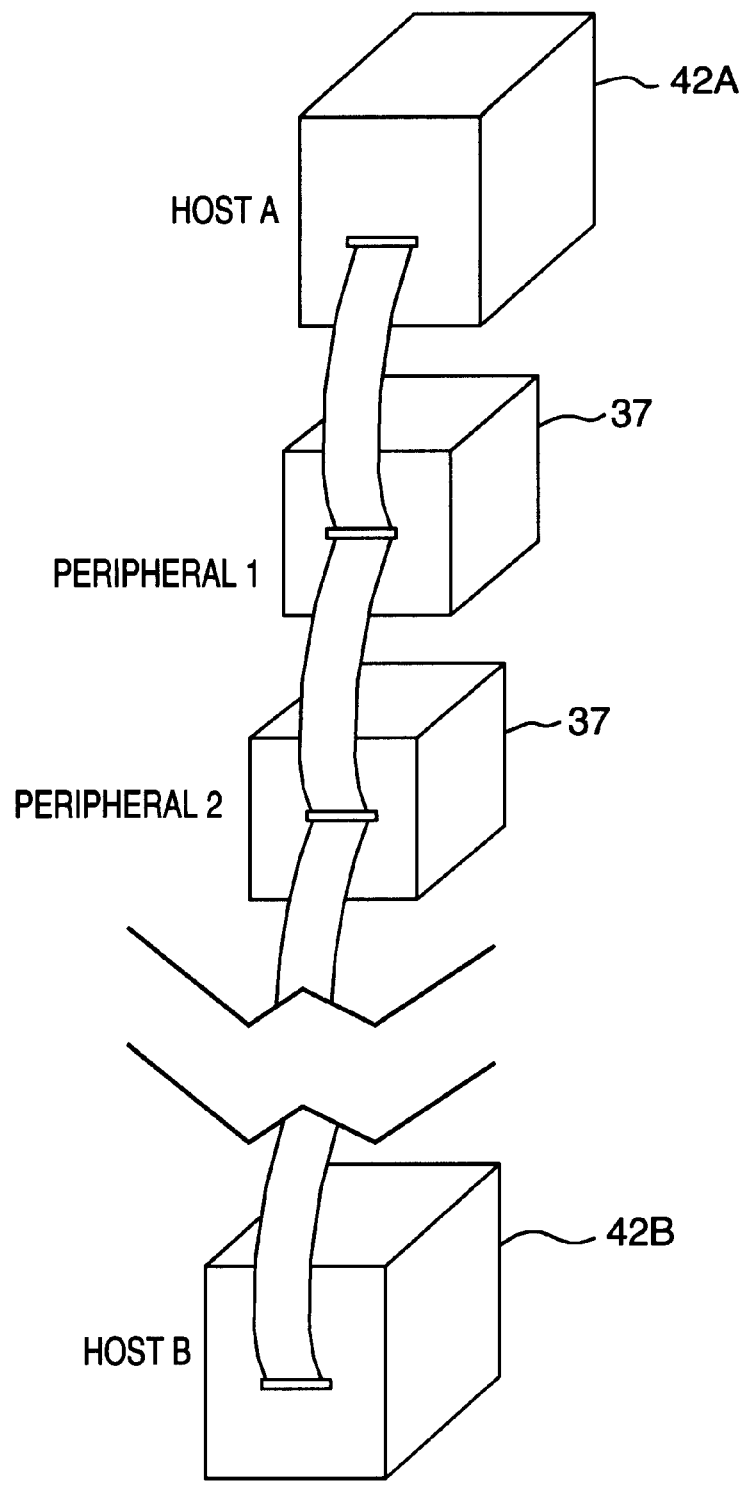
FIG. 4 shows an interconnection scheme suitable for utilizing the controller of FIG. 3 with redundant host computers.

The SCSI bus controller 32, in the preferred embodiment, is a SCSI interface controller chip 53C825 available from Symbios Logic, Inc., Ft. Collins, Colo. (previously known as NCR Corporation, Microelectronics Products Division), and provides an interface between the SCSI bus 25 (FIG. 5) and a host computer system (FIG. 4). This SCSI bus controller 32 transmits and receives data and control signals across the SCSI bus 25 (the SCSI protocol and interface signals are well known in the art, and need not be further described).

The termination control 34 selectively enables/disables the two terminating circuits 36, 38 that reside on the controller card 30 and maintains proper enablement/disablement of these terminating circuits 36, 38 in the event that the controller card 30 powers down. As described above, proper termination is required on both ends of a SCSI bus, in order to reduce signal distortions such as reflections that can otherwise result during high speed transmission over an improperly terminated cable. The truth table of FIG. 6 depicts one method which the termination control 34 can use for enabling/disabling the terminating circuits 36, 38. The termination control 34 assumes that the various devices 133, 135, 137 will properly terminate the one end of the bus. In other words, the truth table of FIG. 6 only depicts whether or not the bus should be terminated at the controller 30. The devices 133, 135, 137 at the other end of bus are responsible for proper termination of their end of the bus.

In a preferred embodiment of the invention, the terminating circuits 36, 38 are each a DS21S07AE, manufactured by the Dallas Semiconductor Corporation. The DS21S07AE provides a DISABLE input that, when brought low by the termination control 38, decouples the DS21S07AE from the SCSI bus 25. As a result the DISABLE input may be thought of as an active high ENABLE input. In other words, when the ENABLE (DISABLE) input is forced high by the termination control 38, the DS21S07AE couples to the SCSI bus 25. Terminating circuits by other manufacturers are provided with similar inputs allowing them to be selectively coupled and decoupled.

The override mechanism 39 may include a manual switch, a jumper, or any other mechanism which allows a user to manually select between an activate state and a deactivate state. When the user manually activates the override mechanism 39, the override mechanism 39 causes the terminating circuit 38 to couple to the SCSI bus 25 no matter what devices if any are coupled to the SCSI ports 24, 26, 28. When the user manually deactivates the override mechanism 39, the override mechanism 39 allows for the termination control 34 to selectively couple the terminating circuit 38 to the SCSI bus 25.

The configuration of SCSI ports 24, 26, 28 allows for internal narrow SCSI devices 33, internal wide SCSI devices 35, external narrow SCSI devices 37, and external wide SCSI devices 37 to be used with the controller card 30. The distinction between internal and external pertains to whether the devices are internal or external to the particular computer housing 23 that the controller card 30 resides in. For example, one computer configuration may have an internal wide 540 Mbyte hard disk drive mounted inside the housing of a personal computer, while also having an external narrow CD-ROM disk drive laying on a desk besides the personal computer. In this configuration, an internal cable 27 would couple the internal hard disk drive 35 to the internal port 26, and an external cable 29 would couple the CD-ROM drive to the external port 28 of the controller card 30 (alternatively, the external cable from the CD-ROM drive could attach to a connector mounted on the housing of the computer, with another cable running inside the housing from the housing connector to the adapter connector).

The main point here is that the controller card 30 has a plurality of ports 24, 26, 28 that may each receive devices 33, 35, 37 of dissimilar bus widths. This allows for attachment of a plurality of dissimilar types of devices (for example devices having different data widths such as narrow SCSI devices and wide SCSI devices).

Now referring to FIG. 4, there is shown one interconnection scheme for coupling redundant host computers 42a, 42b to the SCSI bus. Each host computer 42a, 42b includes a separate controller card 30 (FIG. 3). Therefore, each host computer 42a, 42b could control the SCSI bus in the absence of the other. This preferred interconnection scheme utilizes the external SCSI ports 28 of each controller card 30. The external cable 29 couples the external SCSI port 28 of the host computer 42a to each of the external peripheral devices 37 and then to the external SCSI port 28 of the host computer 42b. Therefore, from the view point of host computer 42a, host computer 42b is essentially the SCSI device 137 of FIG. 3.

While the redundant host structure of FIG. 4 offers the potential for higher reliability, this higher reliability may only be obtained if proper termination of the SCSI bus is maintained in the event of a host failure. In other words, if (a) one of the hosts 42a, 42b fails, (b) the other host remains functional, and (c) the bus remains properly terminated, then the remaining functioning host with its controller 30 may control the SCSI bus. However, the problem is maintaining proper termination of the SCSI bus. In the past, the auto-termination circuitry of the controller was powered by the host. As a result, if the host failed and power was cut off to the controller, then the auto-termination circuitry of the controller was no longer powered and therefore no longer functional. Due to this method of powering the auto-termination circuitry, it was likely in these past systems that the bus would not be properly terminated after a host had cut power to one of the controllers, especially since the controller position relative to the bus prior to the host failure and the controller position after the host failure may have changed due to internal devices of the host no longer being functional. In other words, it is quite possible that the controller was located in a middle portion of the bus prior to the host failure but after the host failure the controller could be located at an end of the bus.

The present invention seeks to maintain proper termination of a SCSI bus even in the event of one of the hosts 42a, 42b fails to supply power to its controller 30. The present invention accomplishes this goal by powering various components of the controller 30 with the TERM POWER line of the SCSI bus instead of or in addition to being powering by its host. Since the controller 30 stays coupled to the bus even in the event of a host failure, these various components of the controller 30 remain powered by the TERM POWER line. Therefore, if the components of the controllers 30, that are needed for determining and executing proper termination, are powered by the TERM POWER line, then proper termination of the bus may be maintained even in the event of a host failure.

Figure 5:
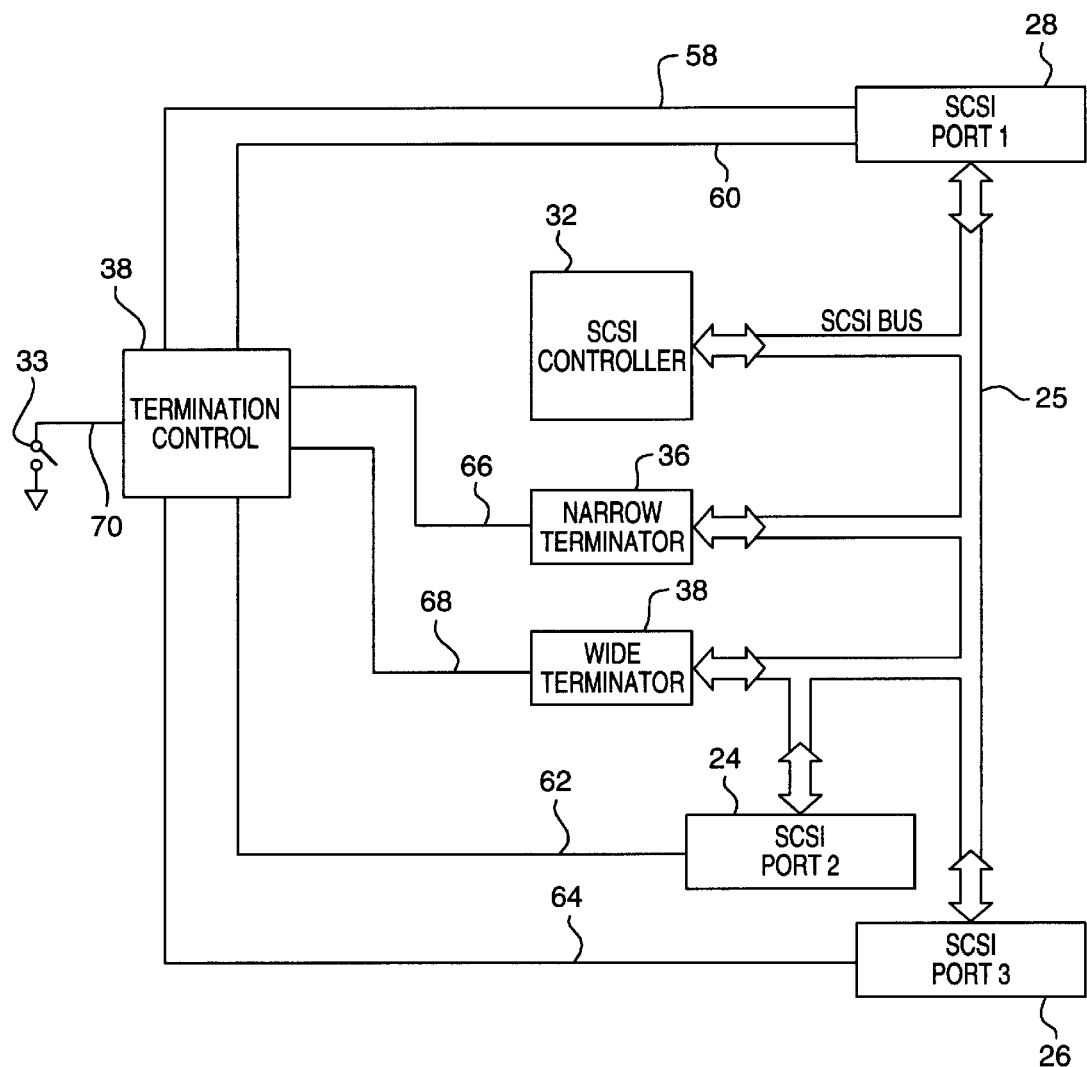
FIG. 5 shows a block diagram illustrating the interconnections between various components of the controller card of FIG. 3.

Turning now to FIG. 5, a block diagram illustrates the interconnections between the various components that constitute the controller card 30 (FIG. 3). A SCSI bus 25 couples a SCSI controller 32 to a first SCSI bus port 28, a second SCSI bus port 24, and a third SCSI bus port 26. As stated above, SCSI bus port 28 is an external wide SCSI port that may receive narrow SCSI devices via a narrow-to-wide SCSI adapter or cable. SCSI bus port 24 is an internal SCSI port that may receive only narrow SCSI devices, and SCSI bus port 26 is an internal SCSI port that may receive only wide SCSI devices.

A present1* line 58 couples a ground pin of port 28 to the terminal control 34 ("*" denotes active when low). A wide1* line 60 couples a ground pin of port 28 to the terminal control 34. A present2* line 62 couples a ground pin of port 24 to the terminal control 34. Likewise a present3* line 64 couples a ground pin of port 26 to the terminal control 34. An enable1 line 66 couples the termination control 34 to the first terminating circuit 36. Likewise, an enable2 line 68 couples the termination control 34 to the second terminating circuit 38. Finally, the override* line 70 couples the override mechanism 39 to the termination control 34.

The present1* line 58 should be confined to one of the narrow ground pins of the port 28 so that the presence of either a narrow SCSI device or a wide SCSI device may be determined from the status of the present1* line 58. A narrow SCSI device coupled to the port 28 would not effect the status of present1* line 58 if the present1* line 58 were connected to one of the wide ground pins of port 28 because by definition the wide ground pins of port 28 are the nine (9) ground pins of the wide port that are utilized by wide devices but not by narrow devices.

The wide1* line 60, however, should be confined to one of the wide ground pins of port 28. By confining the wide1* line 60 to one of the wide ground pins, the status of the wide1* line 60 will indicate whether a wide device is coupled to the port 28, whereas the status of the present1* line 58 merely indicates whether a device (narrow or wide) is coupled to the port 28.

The termination control 34 generates either high or low voltage control signals which are impressed upon the enable1 (F) line 66, and the enable2 (G) line 68 as a function of the status or voltage level received from the present1* (E) line 58, the wide1* (B) line 60, the present2* (C) line 62, the present3* (D) line 64, and the override* (A) line 70. A high voltage control signal upon the enable1 line 66 causes the terminating circuit 36 to couple to the SCSI bus 25, and a low voltage control signal upon the enable1 line 66 causes the terminating circuit 36 to decouple from the SCSI bus 25. Likewise, a high voltage control signal upon the enable2 line 68 causes the terminating circuit 38 to couple to the SCSI bus 25, and a low voltage control signal upon the enable2 line 68 causes the terminating circuit 38 to decouple from the SCSI bus 25.

The preferred response of the termination control 34 to all possible input combinations is depicted in the truth table of FIG. 6. From this truth table the Karnaugh maps of FIG. 7 were constructed and the following equations for enable1 (F), and enable2 (G) were obtained.

$$F = CD + BDE + BCE \quad (1)$$

$$G = B + D + A \quad (2)$$

Several representative cases will now be discussed with reference to the truth table shown in FIG. 6 and the equations (1) and (2) above. As can be seen from lines 1–16 and equation 2. If the override* (A) line 70 is a logical ZERO (i.e. a ground voltage), then the enable2 (G) line is a logical ONE (i.e. +Vdd volts). In other words, if the override mechanism 39 is activated, then the terminating circuit 38 is coupled to the bus 25 thereby terminating the wide portion of the bus 25. Furthermore, it should be noted that by definition the override mechanism 39 has no effect on the terminating circuit 36. Therefore, with regards to the enable1 (F) line 66, the lines 1–16 of the truth table are identical to the lines 17–32 of the truth table. Furthermore, since the status of the enable2 (G) line 68 has already been discussed in regards to lines 1–16 of the truth table, only representative lines from lines 17–32 of the truth table will be discussed further.

Line 32 of the truth table shows the instance where inputs B, C, D, E are all equal to a logical ONE (i.e. +Vdd volts). A logical ZERO (i.e. a ground voltage) represents the presence of a peripheral device coupled to a particular port, so that line 32 of the truth table corresponds to no peripheral devices being attached to any port 24, 26, 28. In this case, outputs F and G are both a logical ONE, meaning that both terminating circuits 36, 38 are enabled and therefore coupled to the bus 25. In other words, both the narrow and wide portions of the bus 25 are terminated at the controller 30.

Line 31 of the truth table, where the E input is logical ZERO, indicates the scenario Where at least one external narrow device 37 is coupled to the controller 30. In this instance, both of the terminating circuits 36, 38 are enabled and therefore coupled to the bus 25 (an alternate embodiment allows for only terminating circuit 36 to be enabled—which corresponds to the low order 8 data bits, parity bit, and control signals—since the high order data bits are unused). The terminating circuit 36 terminates one end of the bus 25, and a terminating circuit on the narrow device 37 terminates the other end of the bus 25. If more than one narrow device 37 were coupled to the port 28, as shown in FIG. 3, only the narrow device 137 at the end of the bus 25 should have a terminating circuit coupled to the bus 25.

Line 30 of the truth table, where the D input is logical ZERO, indicates the scenario where at least one internal wide device 35 is coupled to the controller 30. In this instance, both of the terminating circuits 36, 38 are enabled and therefore coupled to the bus 25. The terminating circuits 36, 38 terminate one end of the bus 25, and a terminating circuit of the wide device 35 terminates the other end of the bus 25. If more than one wide device 35 were coupled to the port 26, as shown in FIG. 3, only the device 135 at the end of the bus 25 should have a terminating circuit coupled to the bus 25.

Line 29 of the truth table, where the D and E inputs are logical ZERO, indicates the scenario where at least one external narrow device 37, and at least one internal wide device 35 is coupled to the controller 30. In this instance, only terminating circuit 38 (which terminates the high order 8-bits and parity) is enabled and therefore coupled to the bus 25 (terminating circuit 36 is disabled). The lower 8-bits and parity, and control signals, are terminated by the terminator circuit provided by the last external narrow device 137 and the last internal wide device 135. The terminating circuit 38 and a terminating circuit of the last internal wide device 135 terminate the wide portion of the bus 25 (the upper 8 data bits and parity bit). Again, if more than one wide device 35 were coupled to the port 26, or more than one narrow device 37 were coupled to the port 28, only the devices 135, 137 at each respective end of the bus 25 should have a terminating circuit coupled to the bus 25.

Line 23 of the truth table, where the B and E inputs are a logical ZERO, indicates the scenario where at least one external wide device 37 is coupled to the controller 30. In this instance, both of terminating circuits 36, 38 are enabled and therefore coupled to the bus 25. The terminating circuits 36, 38 terminate one end of the bus 25, and a terminating circuit of the wide device 37 terminates the other end of the bus 25. If more than one wide device 37 were coupled to the port 28, as shown in FIG. 3, only the device 137 at the end of the bus 25 should have a terminating circuit coupled to the bus 25.

Line 19 of the truth table, where the B, C, and D inputs are logical ZERO, indicates the scenario where at least one external wide device 37, and at least one internal narrow device 33 is coupled to the controller 30. In this instance, only terminating circuit 38 (which terminates the high order 8-bits and parity) is enabled and therefore coupled to the bus 25 (terminating circuit 36 is disabled). The lower 8-bits and parity, and control signals, are terminated by the terminating circuit provided by the last internal narrow device 133 and the last external wide device 137. The terminating circuit 38 and a terminating circuit of the last external wide device 137 terminate the wide portion of the bus 25. Again, if more than one narrow device 33 were coupled to the port 24, or more than one wide device 37 were coupled to the port 28, only the devices 135, 137 at each respective end of the bus 25 should have a terminating circuit coupled to the bus 25.

Notice that in lines 18, 20, 22, 24 of the truth table, the B input is a logical ZERO and the E input is a logical ONE. These scenarios should not actually occur in the preferred embodiment because if a wide device 37 is coupled to the port 28, then both the B and E inputs should be a logical ZERO. As depicted in the truth table, if the B input is a logical ZERO, then the termination circuit 34 assumes that a wide device 37 is coupled to the port 28 whether or not the E input is a logical ZERO. In other words, the status of either the B input or the E input in these scenarios are in conflict in the preferred embodiment, and therefore the termination control 34 must resolve this conflict. In the preferred embodiment, the termination control 34 resolves this conflict in favor of the B input. Alternatively, the termination control 34 could take other actions in these scenarios where the status of B input is a logical ZERO but the status of the E input is a logical ONE. As a result of the preferred embodiments method of resolving this conflict, line 17 is similar to line 18, line 19 is similar to line 20, line 21 is similar to line 22, and line 23 is similar to line 24.

It should be noted that if the ports 24, 26, and 28 each had a device coupled thereto, then the daisy-chain connection scheme of the SCSI protocol would be violated. For this reason, the controller 30 was not designed to have all three ports utilized at the same time. As a result, the scenarios represent by lines 1, 2, 17, 18, should not occur in actual practice.

Figure 8:
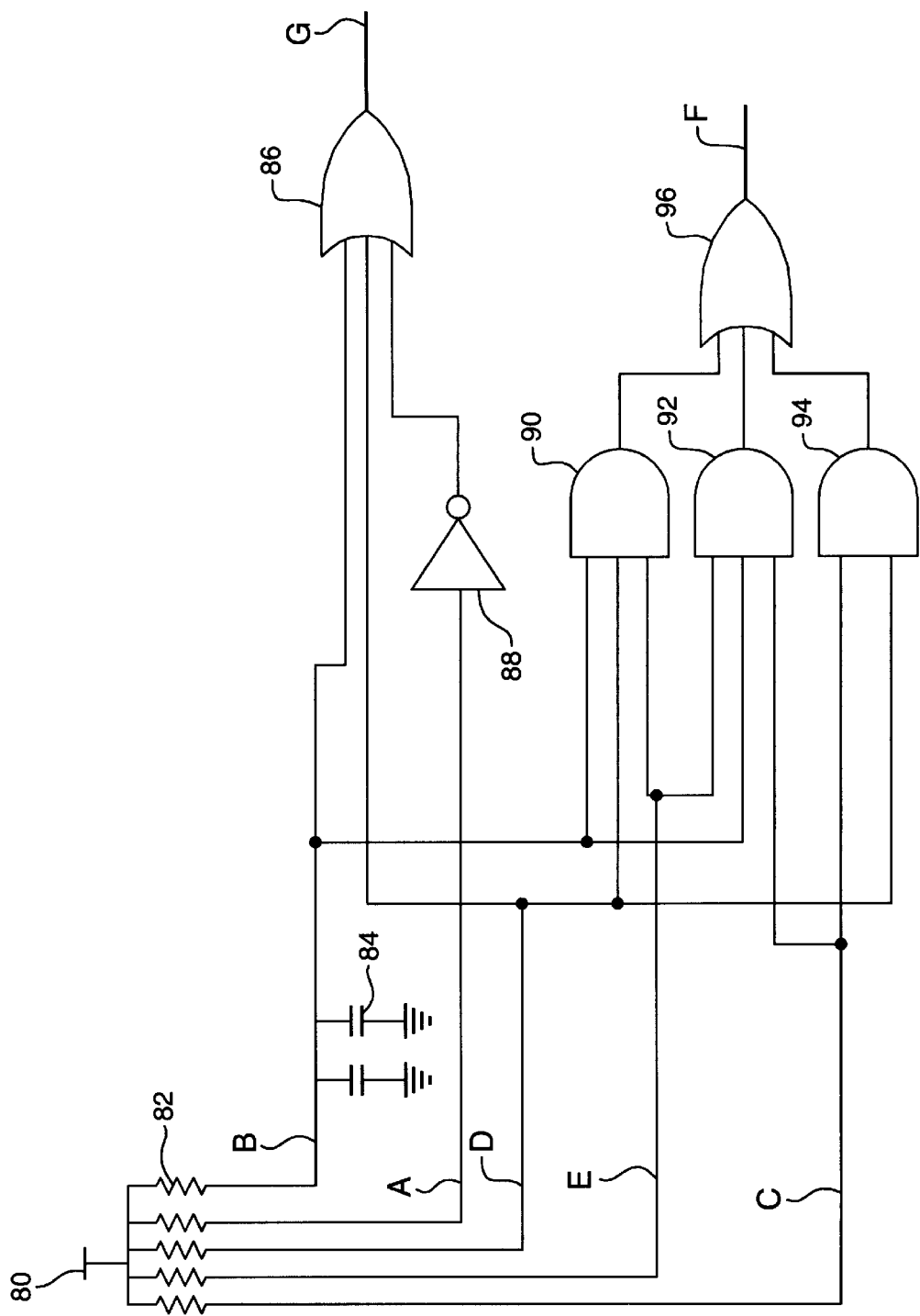
FIG. 8 is a schematic of the termination control of FIG. 3 and FIG. 5.

Referring now to FIG. 8, there is shown circuitry for implementing the termination control 34. The termination control 34 essentially (a) detects whether ports 24, 26, 28 have devices attached thereto, (b) detects the type of device attached to the port 28, and (c) generates enable/disable signals for selectively enabling/disabling terminating circuits 36, 38. Six inputs A, B, C, D, and E are shown. These inputs correspond to the override* line 70, the wide1* line 60, the present2* line 62, the present3* line 64, and the present1* line 58, respectively.

Inputs A, B, C, D, and E are 'pulled-up' by resistors 82 to a +Vdd voltage 80. In the preferred embodiment, each resistor 82 is 4.7 Kohms (although other values such as 1K or 10K are also possible), and +Vdd voltage 80 is +5 volts (although other values such as +3 volts or +12 volts are also possible). Inputs A, B, C, D, and E are active when at zero volts. When a device is coupled to a port 24, 26, 28, the device pulls the ground pins and those inputs coupled to the ground pins to zero volts. Thus, zero volts on the C, D, and E inputs indicates that a device is coupled to its respective port 24, 26, 28, and zero volts on the B input indicates that a wide device is coupled to port 28. Furthermore, when the override mechanism 39 is activated (e.g. the switch of FIG. 3 is closed), the A input is pulled to zero volts.

The A, B, C, D, and E inputs are coupled to a plurality of logic gates 86, 88, 90, 92, 94, 96 shown in total in FIG. 8. These logic gate gates generate the F and G outputs which are carried to the terminating circuits 36, 38 by the enable1 line 66, and the enable2 line 68, respectively. The F and G outputs are active high, meaning that when the F and G outputs are a logical ONE (i.e. +Vdd) the terminating circuits 36, 38 are enabled and coupled to the bus. In particular, the OR gate 86, the NOT gate 88 generate the G output from the A, B, and D inputs. The AND gates 90, 92, 94, and the OR gate 96 generate the F output from the B, C, D, and E inputs. It should be appreciated that the logic circuit of FIG. 8 is not the only way of implementing the equations (1) and (2) above and any known manner of implementing these equations could be used.

The termination control 34 further includes two capacitors 84 (each 0.01 micro-Farads in the preferred embodiment) that are coupled between the wide1* (B) line 60 and ground. As stated above the wide1* line 60 is coupled to one of the wide ground pins. Each of the wide ground pins is paired with either a data pin or a parity pin. In other words, none of the wide ground pins are paired with other ground pins. If these wide ground pins are not coupled to ground, then the integrity of the data is at risk because the data and parity pins are designed to have their respective ground pins coupled to ground. Therefore, the wide1* line 60 cannot be merely pulled up to the +Vdd voltage 80 like the present1* line 58, present2* line 62, and present3* line 64 which utilize ground pins paired with other ground pins.

The capacitors 84 provide a simple solution to this data integrity problem. Once charged, capacitors behave essentially like open circuits to DC signals and behave essentially like closed circuits to AC signals. Even though the data signals are binary, from the stand point of the capacitors 84 the values change rapidly enough to appear as AC signals. Therefore, from the standpoint of the data signal, its respective wide ground pin is coupled to ground, and from the standpoint of the logic gates, the wide ground pin is pulled up to the +Vdd voltage 80.

As was mentioned above, various components of the controller 30 are powered by the TERM POWER line of the SCSI bus. This allows for redundant host systems and/or redundant controller systems that are capable of maintaining proper SCSI bus termination in the event of power to one of the controllers being cut off. In essence, these various components of the controller are being powered by the SCSI bus itself. As should be appreciated from FIG. 8, only the components of the termination control 34 need be powered by the TERM POWER line to generate the proper F and G outputs. Furthermore, the TERM POWER line needs to power the terminating circuits 36, 38 in order to maintain proper termination.

The TERM POWER line of the SCSI bus supplies about 1.5 amps and is used by devices at the end of the SCSI bus to power terminating circuits. As a result, the termination control 34 in the preferred embodiment uses low power logic gates so that TERM POWER line will be able to supply the termination control 34 and the various terminating circuits with adequate power. It is envisioned that the termination control 34 will utilize less than 10 milliamps in the preferred embodiment.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method for maintaining automatic termination of a computer bus in the event of failure of a host computer having a first bus controller, comprising the steps of:
   powering a portion of the first bus controller, said portion comprising a first termination control circuit and a first terminating circuit, with the computer bus;
   powering another portion of the first bus controller with a power bus;
   generating a first control signal (1) that is of an enable state if the first bus controller is located at an end of the computer bus, and (2) that is of a disable state if the first bus controller is located in a middle portion of the computer bus;
   coupling the first terminating circuit to the computer bus if the first control signal is of the enable state; and decoupling the first terminating circuit from the computer bus if the first control signal is of the disable state.

2. The method of claim 1, further comprising the step of: updating the first control signal if the host computer fails.

3. The method of claim 1, further comprising the steps of:
   coupling a second controller to the computer bus;
   powering a second termination control circuit and a second terminating circuit of the second bus controller with the computer bus;
   generating a second control signal (1) that is of an enable state if the second bus controller is located at an end of the computer bus, and (2) that is of a disable state if the second bus controller is located in the middle portion of the computer bus;
   coupling the second terminating circuit to the computer bus if the first control signal is of the enable state; and decoupling the second terminating circuit from the computer bus if the second control signal is of the disable state.

4. The method of claim 1, further comprising the steps of:
   generating a third control signal (1) that is of an enable state if the first bus controller is located at the end of the computer bus with respect to a first bus width, and (2) that is of a disable state if the first controller is located in a middle portion of the computer bus with respect to the first bus width;
   coupling a third terminating circuit of the first bus controller to the computer bus if the third control signal is of the enable state; and
   decoupling the third terminating circuit from the computer bus if the third control signal is of the disable state.

5. The method of claim 4, further comprising the step of: updating the first control signal and the third control signal if the host fails.

6. The method of claim 4, further comprising the step of: manually forcing the third control signal to have the enable state.

7. The method of claim 4, wherein the step of powering the first termination control circuit and the first terminating circuit includes the step of:
   powering the first termination control circuit and the first terminating circuit with a TERM POWER line of a SCSI bus.

8. A controller for maintaining automatic termination of a computer bus in the event of a host failure, said computer bus receiving power from a first power source and said host receiving power from a second power source, comprising:
   a first bus port configured to receive a first device;
   a second bus port configured to receive a second device;
   a first terminating circuit powered by the computer bus and configured to decouple from the computer bus when a first control signal is of a disabled state;
   a termination control circuit powered by the computer bus and coupled to said first terminating circuit, said termination control circuit configured to cause said first control signal to have said disabled state when (a) said first device is coupled to said first bus port, and (b) said second device is coupled to said second bus port.

9. The controller of claim 8, wherein:
   said first terminating circuit is further configured to couple to the computer bus when said first control signal is of an enable state; and
   said termination control circuit is further configured to cause said first control signal to have said enable state when either (a) said first device is not coupled to said first bus port, or (b) said second device is not coupled to said second bus port.

10. The controller of claim 8, wherein:
    said termination control circuit is further configured to cause said first control signal to have said enable state when (a) said first device is not coupled to said first bus port, and (b) said second device is not coupled to said second bus port.

11. The controller of claim 8, further comprising:
    a second terminating circuit powered by the computer bus and configured to decouple from a portion of the computer bus when a second control signal is of a disable state;
    wherein said termination control circuit is further configured to cause said second control signal to have a disable state when (a) said first device is coupled to said first bus port, (b) said second device is coupled to said second bus port, and (c) both said first device and said second device utilize said portion of the computer bus.

12. The controller of claim 11, wherein:
    said second terminating circuit is further configured to couple to said portion of the computer bus when said second control signal is of an enable state;
    said termination control circuit is further configured to cause said second control signal to have said enable state when (a) said first device is coupled to said first bus port, (b) said second device is coupled to said second bus port, and (c) said first device does not utilize said portion of the computer bus.

13. The controller of claim 8, wherein:
    said first terminating circuit and said termination control circuit collectively draw less than 10 milliamps.

14. The controller of claim 13, wherein:
    a TERM POWER line of a SCSI bus powers said first terminating circuit and said termination control circuit.

15. A data processing system, comprising:
    a first bus controller powered at least partially by a power source and comprising a first bus port, a second bus port, a first terminating circuit, and a first termination control circuit;
    a second bus controller comprising a third bus port;
    a bus interconnecting said first bus port and said third bus port;
    said first terminating circuit powered by said bus and configured to couple to said bus if a first control signal is of an enable state and to decouple from said bus if said first control signal is of a disable state; and said first termination control circuit powered by said bus and configured to generate a first control signal (1) that is of said enable state if said first bus controller is located at an end of said bus, and (2) that is of said disable state if said first bus controller is located in a middle portion of said bus.

16. The data processing system of claim 15, wherein:

said second bus controller further comprises a second termination control circuit and a second terminating circuit;

said bus powers said second termination control circuit and said second terminating circuit;

said second terminating circuit is configured to couple to said bus if a second control signal is of an enable state and to decouple from said bus if said second control signal is of a disable state; and said first termination control circuit is configured to generate a second control signal (1) that is of said enable state if said first bus controller is located at an end of said bus, and (2) that is of said disable state if said first bus controller is located in said middle portion of said bus.

17. The data processing system of claim 15, further comprising:

a first host computer;

a second host computer;

wherein said first controller is located within said first host computer; and wherein said second controller is located within said second host computer.

18. The data processing system of claim 17, wherein:

said first termination control circuit is further configured to update said first control signal if said first host computer fails.

19. The data processing system of claim 17, wherein:

said bus is a SCSI bus; and a TERM POWER line of said bus powers said first terminating circuit, said first termination control circuit, said second terminating circuit, and said second termination control circuit.

20. The data processing system of claim 17, wherein:

said first bus controller further comprises a third terminating circuit that is configured to couple to said bus if a third control signal is of an enable state and to decouple from said bus if said third control signal is of a disable state; and said first termination control circuit is further configured to generate a third control signal (1) that is of an enable state if said first bus controller is located at an end of said bus with respect to a first bus width, and (2) that is of a disable state if said first bus controller is located in said middle portion of said bus with respect to said first bus width.

21. The data processing system of claim 19, wherein:

said first termination control circuit is further configured to update said first control signal and said third control signal if said first host computer fails; and said second termination control circuit is further configured to update said second control signal if said second host computer fails.

* * * * *